United States Patent [19]

Nakayama

[11] Patent Number: 5,182,447

[45] Date of Patent: Jan. 26, 1993

[54] PHOTOELECTRIC CONVERTING APPARATUS WITH MAXIMUM AND MINIMUM ACCUMULATION DETECTING

[75] Inventor: Toshiki Nakayama, Atsugi, Japan

[73] Assignee: Canon Kabushiki Kaisha, Tokyo, Japan

[21] Appl. No.: 616,211

[22] Filed: Nov. 20, 1990

[30] Foreign Application Priority Data

Nov. 22, 1989 [JP] Japan .................. 1-301818

[51] Int. Cl.$^5$ .............................................. H01J 40/14
[52] U.S. Cl. .............................. 250/208.1; 358/213.31
[58] Field of Search ............... 250/208.1, 208.2, 201.6, 250/201.7, 201.8, 210, 204; 358/213.19, 213.27, 213.31, 213.26

[56] References Cited

U.S. PATENT DOCUMENTS

4,633,075  12/1986  Sakai et al. ...................... 250/204
4,701,626  10/1987  Ishizaki et al. ............... 250/214 AG
4,839,735   6/1989  Kyomasu et al. ............... 358/213.31

Primary Examiner—David C. Nelms
Attorney, Agent, or Firm—Fitzpatrick, Cella, Harper & Scinto

[57] ABSTRACT

A photoelectric converting apparatus having a plurality of photoelectric conversion elements which can accumulate charges which were photoelectrically converted comprises: at least one of a maximum value detection circuit to detect an accumulation signal of the photoelectric conversion element into which the strongest light enters and a minimum value detection circuit to detect an accumulation signal of the photoelectric conversion element into which the weakest light enters; and a reading circuit to read out the signal(s) which is/are obtained from the maximum value detection circuit or/and the minimum value detection circuit through the same reading system as that of the accumulation signals of the plurality of photoelectric conversion elements.

12 Claims, 11 Drawing Sheets

PHOTOELECTRIC CONVERTING APPARATUS WITH MAXIMUM AND MINIMUM ACCUMULATION DETECTING

BACKGROUND OF THE INVENTION

1. Field of the Invention

The present invention relates to a photoelectric converting apparatus and, more particularly, to a photoelectric converting apparatus having a plurality of photoelectric conversion elements which can accumulate the photoelectrically converted charges. The invention is suitably used in a photoelectric converting apparatus for use in, for instance, a focal point detecting apparatus of a camera, an image reading apparatus, or the like.

2. Related Background Art

Hitherto, such a kind of apparatus has already been proposed in, for instance, Japanese Patent Application No. 63-47644 by the applicant of the present invention.

Figure 7:
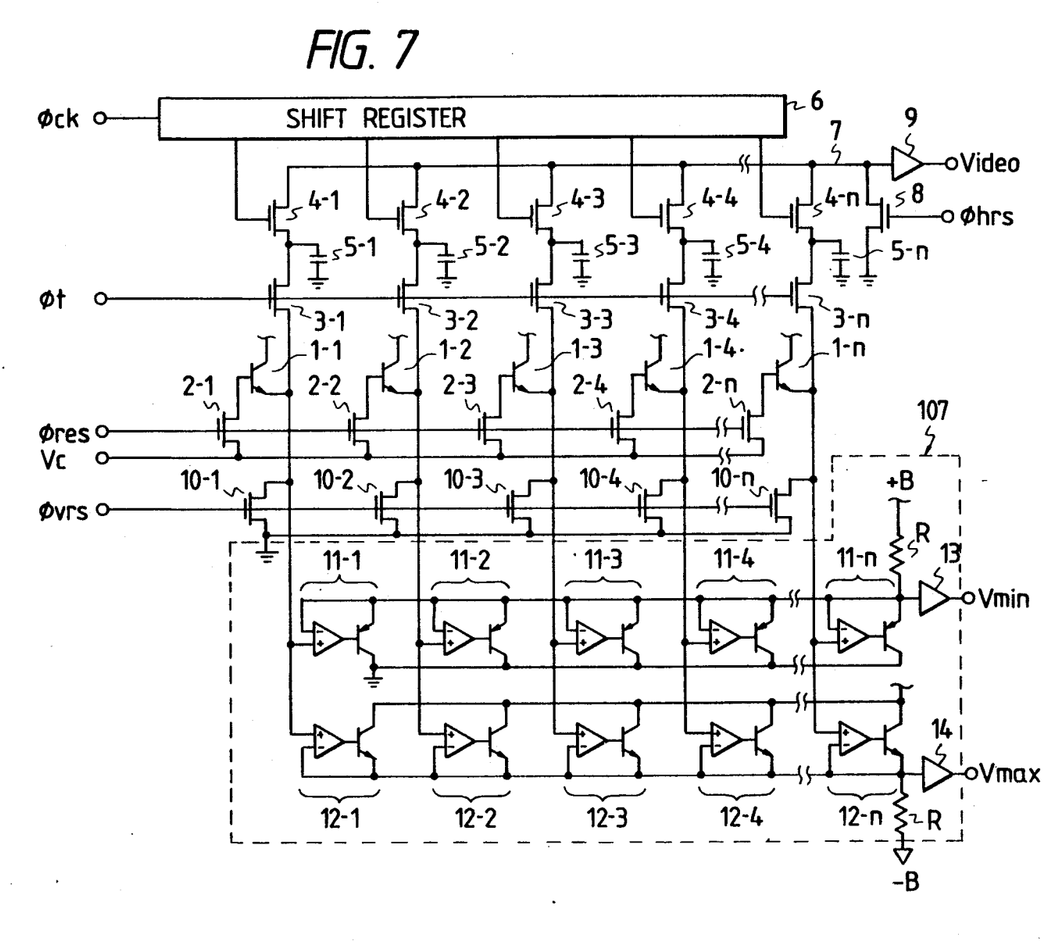
FIG. 7 is an equivalent circuit diagram of a photoelectric conversion element array shown in Japanese Patent Application No. 63-47644.

FIG. 7 shows an equivalent circuit diagram of a photoelectric conversion element array shown in Japanese Patent Application No. 63-47644.

In FIG. 7, reference numerals 1—1 to 1-n denote a photo transistor array (cells) of the accumulation type having a structure such that a common power source is connected to collectors and the photoelectrically converted charges are accumulated into control electrode regions (bases) and can be read out from main electrode regions (emitters). A practical content of the above structure has been described in detail in, for instance, Japanese Laid-open Patent Gazette Nos. 62-128678 and 62-113468, Japanese Patent Application Nos 61-168286, 61-219668, and 61-219669, and the like. Reference numerals 2-1 to 2-n denote PMOS switches for connecting the base of each of the bipolar transistors constructing the photo transistor array 1 to a power source $V_c$ and resetting when a signal $\phi_{res}$ is given. Reference numerals 3-1 to 3-n denote NMOS switches, connected to the emitters of the above bipolar transistors, for taking out the accumulated signals to the post stage synchronously with a signal $\phi_t$. Reference numerals 4-1 to 4-n denote NMOS switches, connected serially to the NMOS switches 3-1 to 3-n, for sending an image signal to a read-out line 7. Reference numerals 5-1 to 5-n denote accumulation capacitors, connected between the nodes of the NMOS switches 3-1 to 3-n and the NMOS switches 4-1 to 4-n and the ground, for reading out the signal every pixel. Reference numeral 6 denotes a shift register for sequentially turning on the NMOS switches 4-1 to 4-n and successively reading out the image signal; 8 an NMOS switch for initializing by connecting the read-out line 7 to which output terminals of the NMOS switches 4-1 to 4-n are commonly connected to the ground when a signal $\phi_{hrs}$ is given; 9 an output amplifier for amplifying the image signal which was output to the read-out line 7; and 10-1 to 10-n NMOS switches for connecting the emitters of the photo transistor array 1—1 to 1-n to the ground when a signal $\phi_{vrs}$ is given. Reference numeral 107 indicates a max/min values detection circuit comprising: minimum value detection circuits 11-1 to 11-n, maximum value detection circuits 12-1 to 12-n, and output amplifiers 13 and 14.

Figure 8:
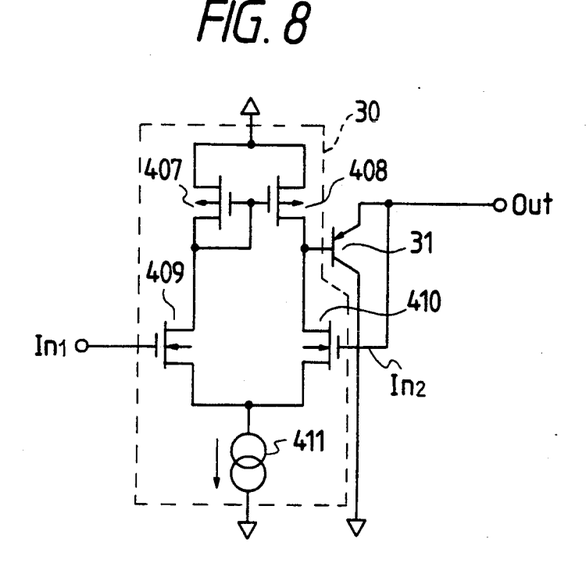
FIG. 8 is a circuit diagram showing a construction of one unit of a minimum value detection circuit.

FIG. 8 shows a construction of one unit of the minimum value detection circuit.

As shown in FIG. 8, one minimum value detection circuit comprises one differential amplifier 30 and one PNP type transistor 31. The differential amplifier 30 comprises a constant current circuit 411, PMOS transistors 407 and 408, and NMOS transistors 409 and 410. An emitter line of the PNP type transistor 31 is fed back to an inversion input ($I_{n2}$) of the differential amplifier 30. The emitters of the pixel trains of the photo transistor array 1—1 to 1-n are input to a non-inversion input ($I_{n1}$) When the level of the non-inversion input ($I_{n1}$) of the differential amplifier 30 is higher than the level of the inversion input ($I_{n2}$), a base potential of the PNP type transistor 31 is shifted to about the power source voltage level, thereby turning off the PNP type transistor 31. Therefore, no voltage is developed in an input of the output amplifier 13 shown in FIG. 7. An output voltage is caused in the PNP type transistor 31 in the case where the lowest voltage was given to the non-inversion input ($I_{n1}$) of the differential amplifier 30. In this case, the minimum value is detected.

Figure 9:
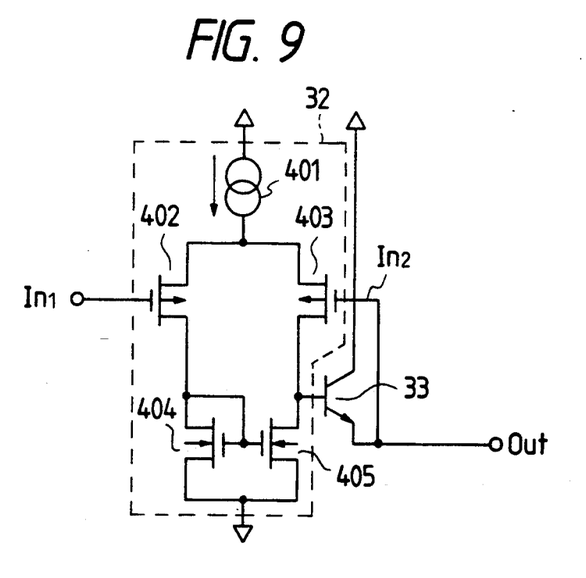
FIG. 9 is a circuit diagram showing a construction of one unit of a maximum value detection circuit.

FIG. 9 shows a construction of one unit of the maximum value detection circuit.

As shown in FIG. 9, one maximum value detection circuit comprises one differential amplifier 32 and one NPN type transistor 33. The differential amplifier 32 comprises a constant current circuit 401, PMOS transistors 402 and 403, and NMOS transistors 404 and 405. An emitter line of the NPN type transistor 33 is fed back to the inversion input ($I_{n2}$) of the differential amplifier 32 and is used as an output line. The emitters of the pixel train are connected to the non-inversion input ($I_{n1}$). When the level of the non-inversion input ($I_{n1}$) of the differential amplifier 32 is lower than the level of the inversion input ($I_{n2}$), a base potential of the NPN type transistor 33 is reduced to about the voltage level of a negative power source, so that the NPN type transistor 33 is turned off. An output voltage is caused in the NPN type transistor 33 when the highest voltage was applied to the non-inversion input ($I_{n1}$) of the differential amplifier 32. In this case, the maximum value is detected. R denotes a load resistor in each of the minimum value detection circuit and the maximum value detection circuit.

Figure 10:
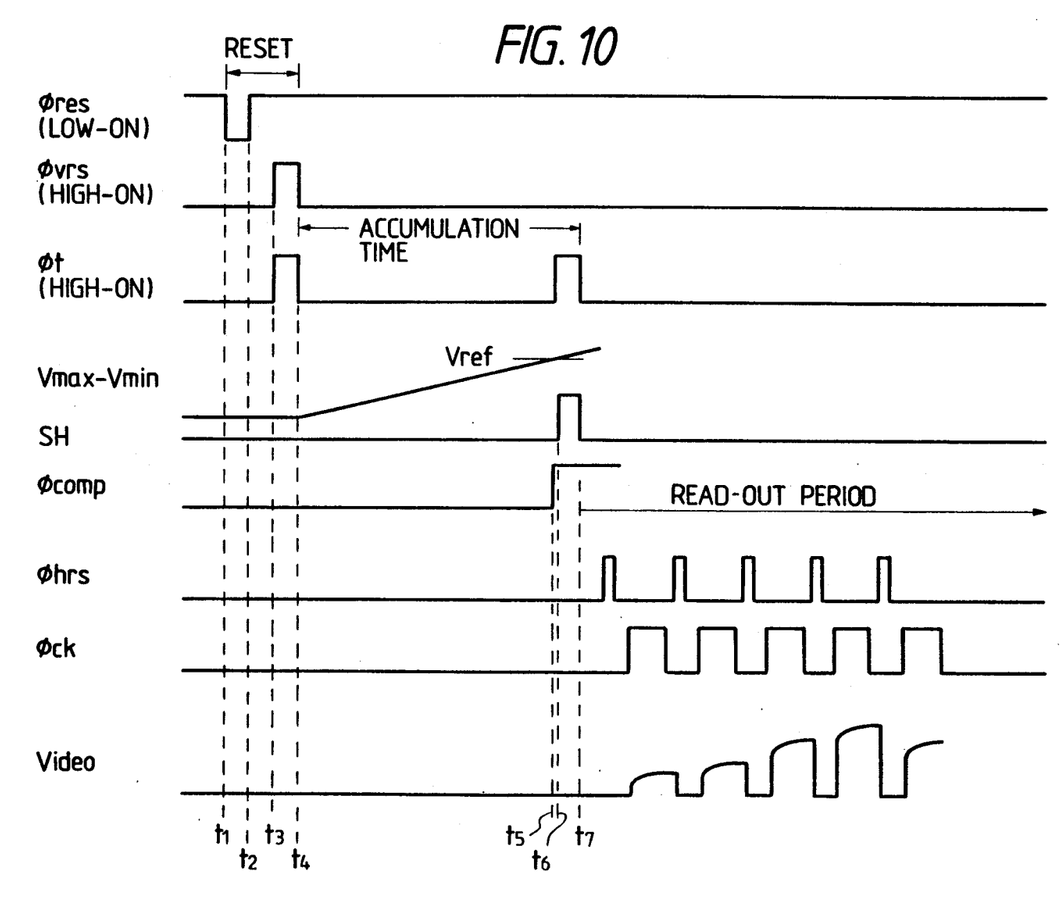
FIG. 10 is a timing chart for explaining the operation of the photoelectric conversion element array shown in FIG. 7.

FIG. 10 is a timing chart for explaining the operation of the photoelectric conversion element array in FIG. 7.

First, a resetting operation is executed. By turning on the PMOS switches 2-1 to 2-n by setting the signal $\phi_{res}$ to the low level for a period of time from $t_1$ to $t_2$, base potentials of the photo transistor array (hereinafter, referred to as a pixel train) 1—1 to 1-n are fixed to the potential of $V_c$.

Then, by setting the signals $\phi_{vrs}$ and $\phi_t$ to the high level (ON) for a period of time from $t_3$ to $t_4$, the NMOS switches 10-1 to 10-n and 3-1 to 3-n are made conductive, the accumulation capacitors 5-1 to 5-n are connected to the grounded, and the residual charges are reset. After completion of the resetting for the bases and emitters of the pixel train 1—1 to 1-4, the next accumulating operation is started.

In the accumulating operation, the photoelectrically converted charges are accumulated into the base regions of the pixel train 1—1 to 1-n. At this time, the bases and emitters of the pixel train are in the floating state (capacitive load state) and the voltage to which the base potential was reflected is caused in the emitters.

When the signals are sequentially read out, the NMOS switches 4-1 to 4-n are sequentially turned on by the shift register 6 and the signal charges accumulated in the accumulation capacitors 5-1 to 5-n are read out to the read-out line 7. Each time the signal $\phi_{CK}$ is input, the shift register 6 sequentially selects the NMOS switches 4-1 to 4-n. Just before the NMOS switches 4-1 to 4-n are selected, the NMOS switch 8 is turned on by the signal $\phi_{hrs}$ and the charges remaining in the read-out line 7 are reset.

Figure 11:
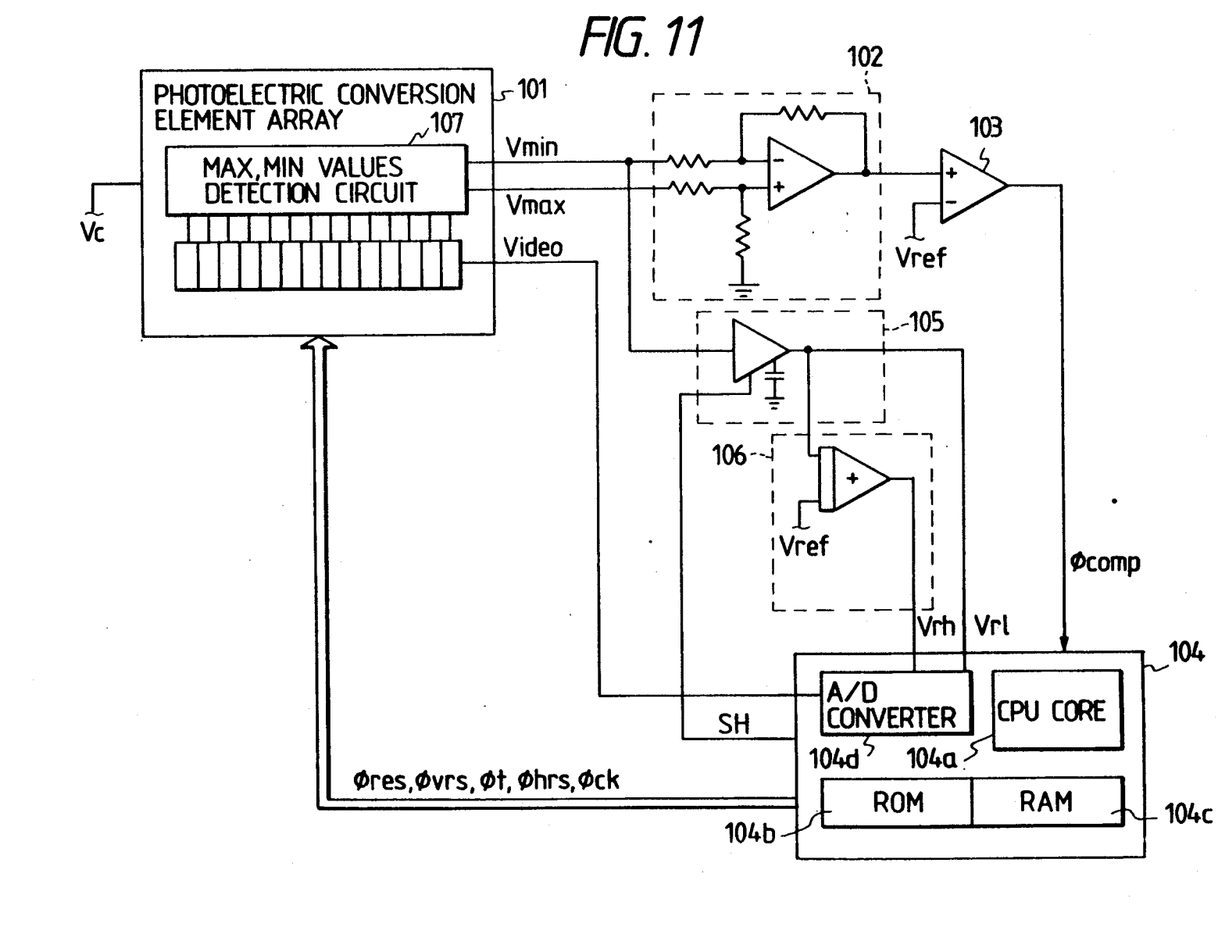
FIGS. 11 and 12 are block diagrams of the practical photoelectric converting apparatuses using a conventional photoelectric conversion element array.
Figure 12:
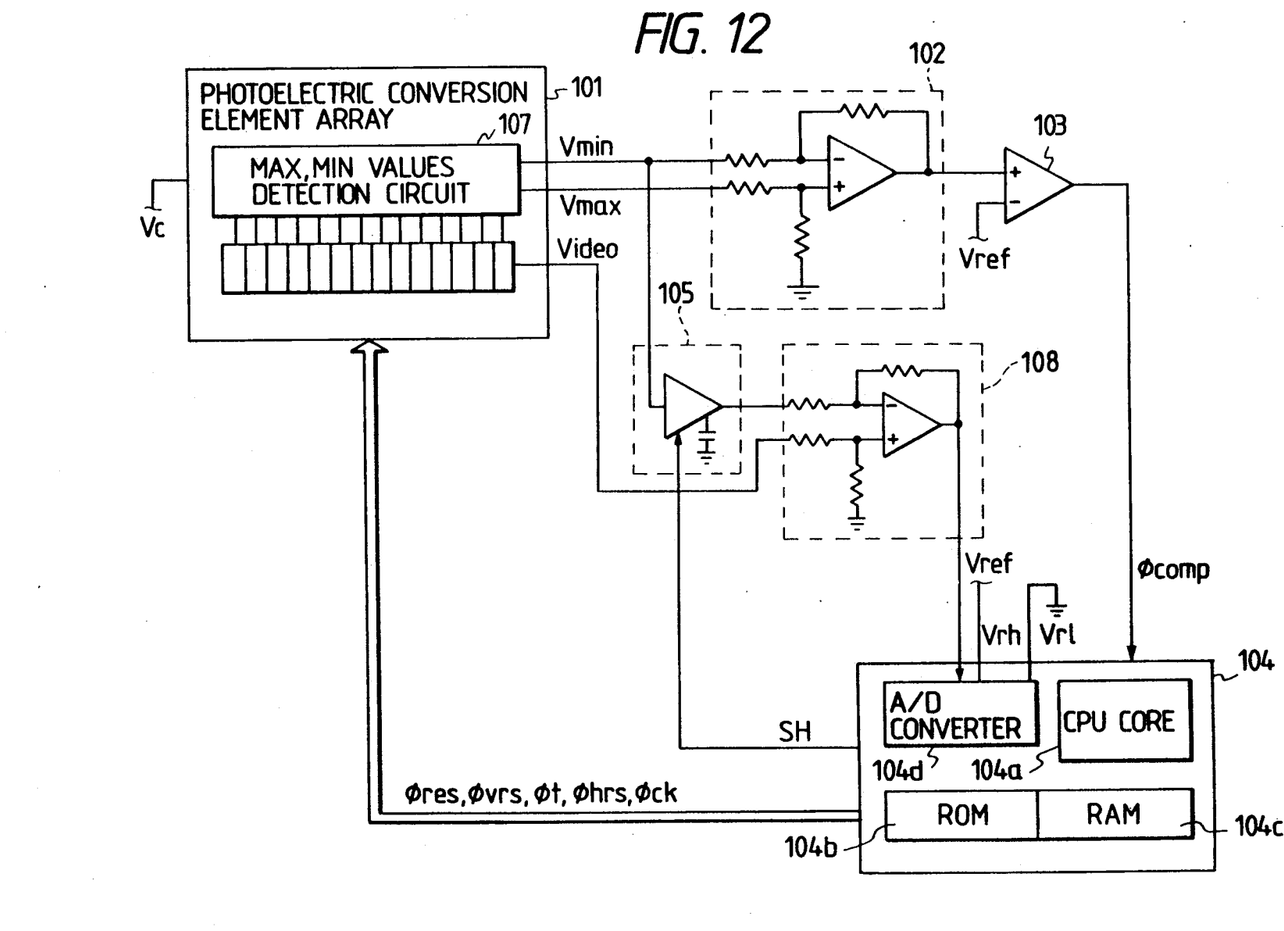

In Japanese Patent Application No. 63-47644, there has been proposed a method whereby by constructing a photoelectric converting apparatus as shown in FIG. 11 or 12 by using the photoelectric conversion element array having the max/min values detection circuit as mentioned above, the accumulation time is controlled so as to keep differences between a bright portion, and a dark portion constant a pattern of an object, and only a characteristic portion of the pattern is A/D converted, In the above apparatuses, a discrimination regarding whether the signal charges are accumulated until a proper level or not is performed by checking to see if a difference between the maximum and minimum levels of the accumulation levels of the photoelectric conversion element array has reached the reference level $V_{ref}$ or not. Reference numeral 102 denotes a differential amplifier to calculate the difference between a maximum value $V_{max}$ and a minimum value $V_{min}$. Reference numeral 103 indicates a comparator for comparing an output level of the differential amplifier 102 and the predetermined reference level $V_{ref}$, thereby discriminating whether the output level has reached the proper accumulation level or not. When a signal $\phi_{comp}$ of the comparator 103 is inverted, a microcomputer 104 detects that the signal charges were accumulated until the reference level. Then, the microcomputer 104 sends the pulse $\phi_t$ to finish the accumulation to a photoelectric conversion element array 101. At the same time, the microcomputer 104 sends a signal SH to a memory circuit 105, thereby storing the $V_{min}$ level at the time of completion of the accumulation. Then, the signals $\phi_{CK}$ and $\phi_{hrs}$ are sent to the read pulse, an image (Video) signal is read out of the photoelectric conversion elements and is A/D converted.

At this time, in the example of FIG. 11, an A/D conversion range is level shifted in accordance with a range of the image signal. In the example of FIG. 12, the pixel signal is level shifted in accordance with an A/D conversion range. In each of the above examples, the A/D conversion is performed between the maximum and minimum values of the image signal.

An in-focus state can be discriminated by executing the calculation disclosed in Japanese Laid-Open Patent Gazette Nos. 58-142306, 59-107313, 60-101513, or Japanese Patent Application No. 61-160824 on the basis of the digital pixel signal obtained as mentioned above.

However, in the above conventional photoelectric converting apparatus, the image signal and the maximum and minimum values of the image signal and of the accumulation signal of the photoelectric conversion element array are output through different read-out circuits respectively, so that there is a case where there are deviations between the actual maximum and minimum values of the pixel signal and the values of $V_{max}$ and $V_{min}$ because of causes such as difference of the read-out gain, mismatching among the amplifiers 9, 13, and 14, or the like. On the other hand, as shown in the examples of FIGS. 11 and 12, when the accumulation charges are controlled on the basis of the difference between $V_{max}$ and $V_{min}$, there is a case where a part of the image signal exceeds the A/D conversion range.

The difference of the read-out gain occurs as follows. For instance, in FIG. 7, assuming that a capacity of the accumulation capacitor 5-1 is set to $C_{T1}$ and a parasitic capacity of the read-out line 7 is set to $C_H$, in the case where an emitter potential $V_{E1}$ of the photo transistor 1—1 was read out to the read-out line 7, an output becomes $$\frac{C_{T1}}{C_{T1} + C_H}.$$

$V_{E1}$ and the gain is not set to 1.

On the other hand, since the $V_{min}$ and $V_{max}$ outputs are read out at the gain 1, a deviation occurs.

SUMMARY OF THE INVENTION

It is an object of the invention to solve the drawbacks in the conventional techniques as mentioned above and, more particularly, to eliminate a variation among amplifiers.

According to an embodiment of the present invention, there is provided a photoelectric converting apparatus having a plurality of photoelectric conversion elements which can accumulate charges which were photoelectrically converted, comprising: at least one of maximum value detecting means for detecting an accumulation signal of the photoelectric conversion element into which a strongest light enters and minimum value detecting means for detecting an accumulation signal of the photoelectric conversion element into which a weakest light enters; and reading means for reading the signal(s) which is/are obtained from the maximum value detecting means or/and the minimum value detecting means through the same reading system as that of accumulation signals of the plurality of photoelectric conversion elements.

On the other hand, according to another embodiment of the invention, there is provided a photoelectric converting apparatus having a plurality of photoelectric conversion elements which can accumulate charges which were photoelectrically converted, comprising: at least one of maximum value detecting means for detecting an accumulation signal of the photoelectric conversion element into which a strongest light enters and minimum value detecting means for detecting an accumulation signal of the photoelectric conversion element into which a weakest light enters; calculating means for calculating on the basis of the signal(s) which is/are obtained from the maximum value detecting means or/and the minimum value detecting means; and reading means for reading out a signal which is obtained from the calculating means through the same reading system as that of accumulation signals of the plurality of photoelectric conversion elements.

As mentioned above, according to the first embodiment of the invention, since the reading means for reading the signal(s) which is/are obtained from the maximum value detecting means or/and the minimum value detecting means through the same reading system as that of the accumulation signals of the plurality of photoelectric conversion elements is provided, the reading system for reading out the maximum value detection signal or/and the minimum value detection signal and the reading system for reading out the accumulation signals of the plurality of photoelectric conversion elements are commonly used, thereby eliminating a deviation between the maximum value detection signal or/and the minimum value detection signal and the accumulation signals. Thus, the signal to which the charges accumulated in the plurality of photoelectric conversion elements were accurately reflected can be obtained.

According to the second embodiment of the invention, by providing the means for calculating on the basis of the signal(s) which is/are obtained from the maximum value detecting means or/and the minimum value detecting means and the reading means for reading out the signal which is obtained by the calculation through the same reading system as that of the accumulation signals of the plurality of photoelectric conversion elements, the reading system for reading out the signal obtained by the calculation and the reading system for reading out the accumulation signals of the plurality of photoelectric conversion elements are commonly used. Thus, a deviation between the signal obtained by the calculation and the accumulation signals is eliminated and the signal to which the charges accumulated in the plurality of photoelectric conversion elements were accurately reflected can be obtained.

DETAILED DESCRIPTION OF THE PREFERRED EMBODIMENTS

An embodiment of the present invention will be described in detail hereinbelow with reference to the drawings.

Figure 1:
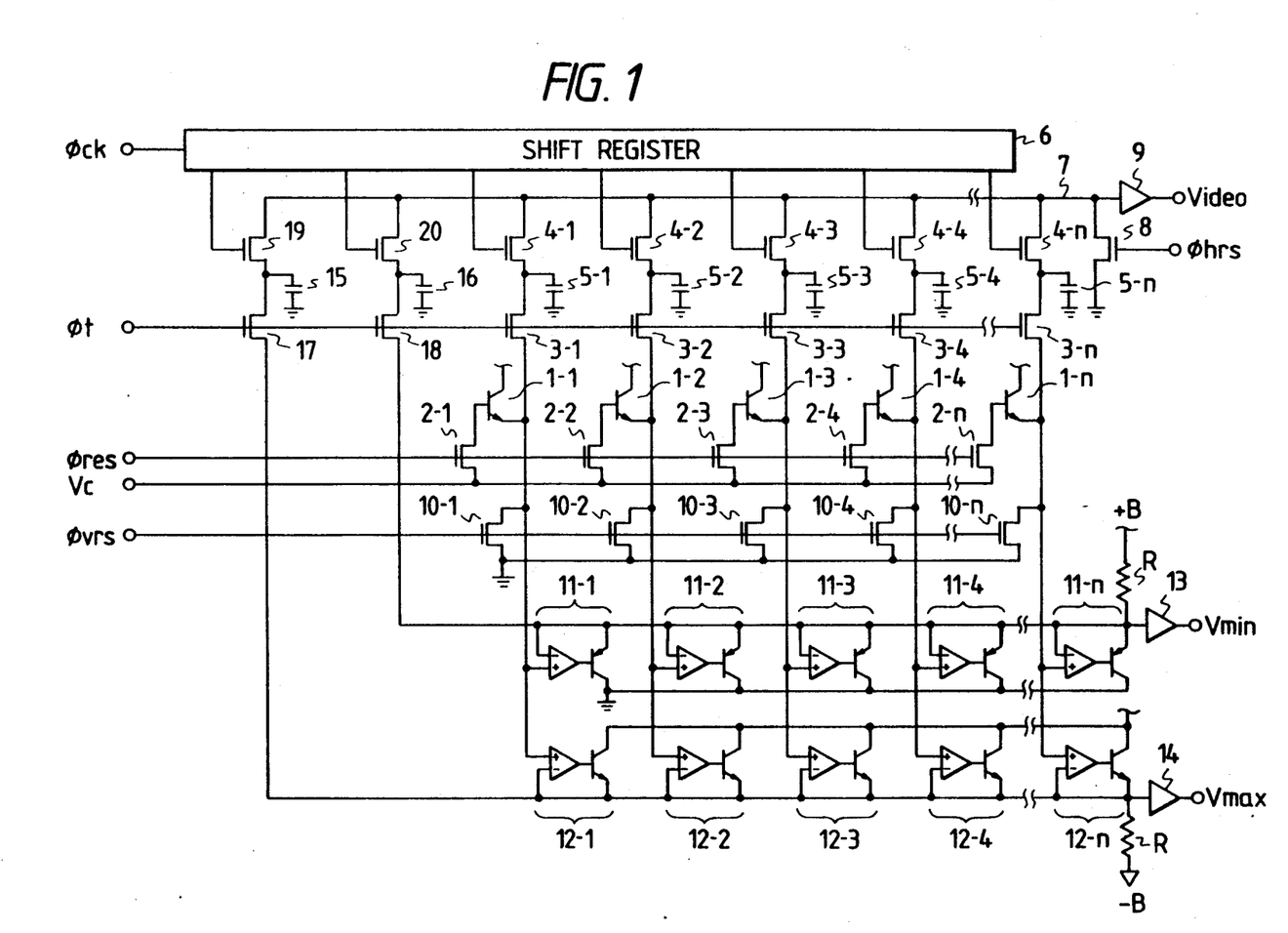
FIG. 1 is a circuit diagram showing a construction of the first embodiment of a photoelectric conversion element array as a characteristic portion of a photoelectric converting apparatus according to the invention.

FIG. 1 is a circuit diagram showing a construction of the first embodiment of a photoelectric conversion element array as a characteristic portion of a photoelectric converting apparatus of the invention. The same parts and component as those shown in FIG. 7 are designated by the same reference numerals and their descriptions are omitted here.

As shown in FIG. 1, the photoelectric conversion element array according to the invention has the following component members in addition to the conventional photoelectric conversion element array shown in FIG. 7. Reference numerals 17 and 18 denote NMOS switches, connected to the outputs of the maximum value detection circuits 12-1 to 12-n and the minimum value detection circuits 11-1 to 11-n, for taking out the maximum and minimum values to the post stage synchronously with the signal $\phi_t$, respectively. Reference numerals 19 and 20 denote NMOS switches, connected serially with the NMOS switches 17 and 18, for sending the maximum and minimum values to the output line 7. Reference numerals 15 and 16 denote accumulation capacitors, connected between the nodes of the NMOS switches 17 and 18 and the NMOS switches 19 and 20 and the ground, for reading out the signals of the maximum and minimum values, respectively.

Figure 2:
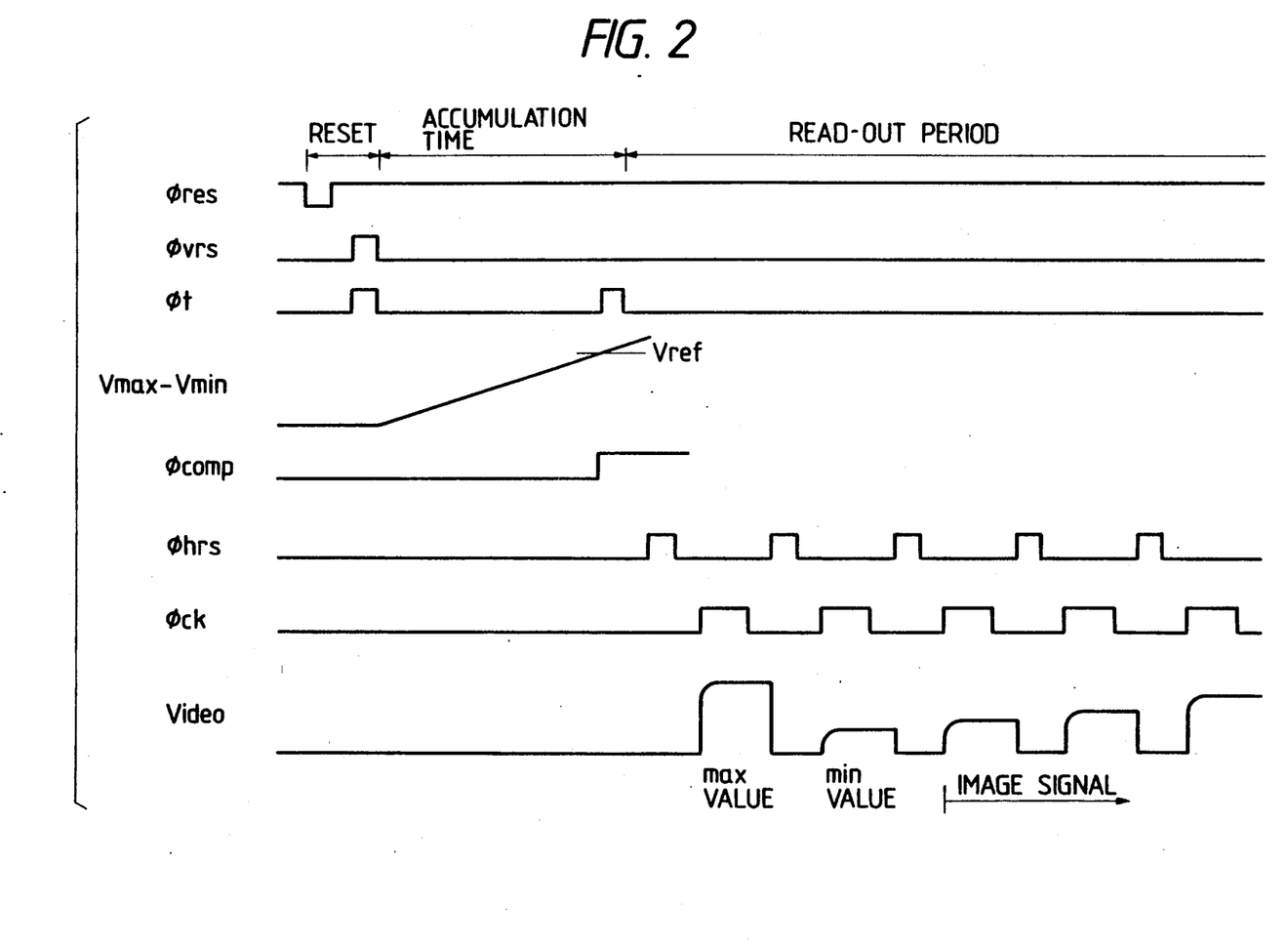
FIG. 2 is a timing chart for explaining the operation of the photoelectric conversion element array of the first embodiment.

FIG. 2 is a timing chart for explaining the operation of the photoelectric conversion element array.

Since the operations until the start of the accumulation are similar to the operations of the conventional photoelectric conversion element array described in conjunction with FIGS. 7 to 10, their descriptions are omitted here.

In the accumulating operation, the charges which were photoelectrically converted are accumulated into the control electrode regions (base regions) of the pixel train 1—1 to 1-n. At this time, the bases and emitters of the pixel train 1—1 to 1-n are in the floating state (capacitive load stage) and a voltage to which the base potential was reflected is caused in each emitter. On the other hand, an output corresponding to the maximum output of the pixel train 1—1 to 1-n appears at a $V_{max}$ output terminal. An output corresponding to the minimum output of the pixel train 1—1 to 1-n appears at a $V_{min}$ output terminal.

Upon completion of the accumulation, the maximum output level, the minimum output level, and the output level of each pixel at that time point are respectively accumulated into the accumulation capacitors 15, 16, and 5-1 to 5-n by the transfer pulse $\phi_t$. Upon reading, the NMOS switches 19, 20, 4-1 to 4-n are sequentially turned on by the shift register 6, thereby reading out the signals accumulated in the accumulation capacitors 15, 16, and 5-1 to 5-n to the read-out line 7. Each time the clock $\phi_{CK}$ is input, the shift register 6 sequentially selects the NMOS switches 19, 20, and 4-1 to 4-n. Just before the NMOS switches 19, 20, and 4-1 to 4—4 are selected, the NMOS switch 8 is turned on by the signal $\phi_{hrs}$ and the remaining charges in the read-out line 7 are reset.

As will be obviously understood from the above description, in the embodiment, the signals of the maximum and minimum outputs of the photoelectric conversion element array at the end of the accumulation can be read out onto the same read-out line through the same reading circuit as that of the pixels. Therefore, there is no difference between the read-out gains and the apparatus is not influenced by the mismatching of the amplifiers. The maximum and minimum outputs of the photoelectric conversion element array can be accurately obtained.

Figure 3:
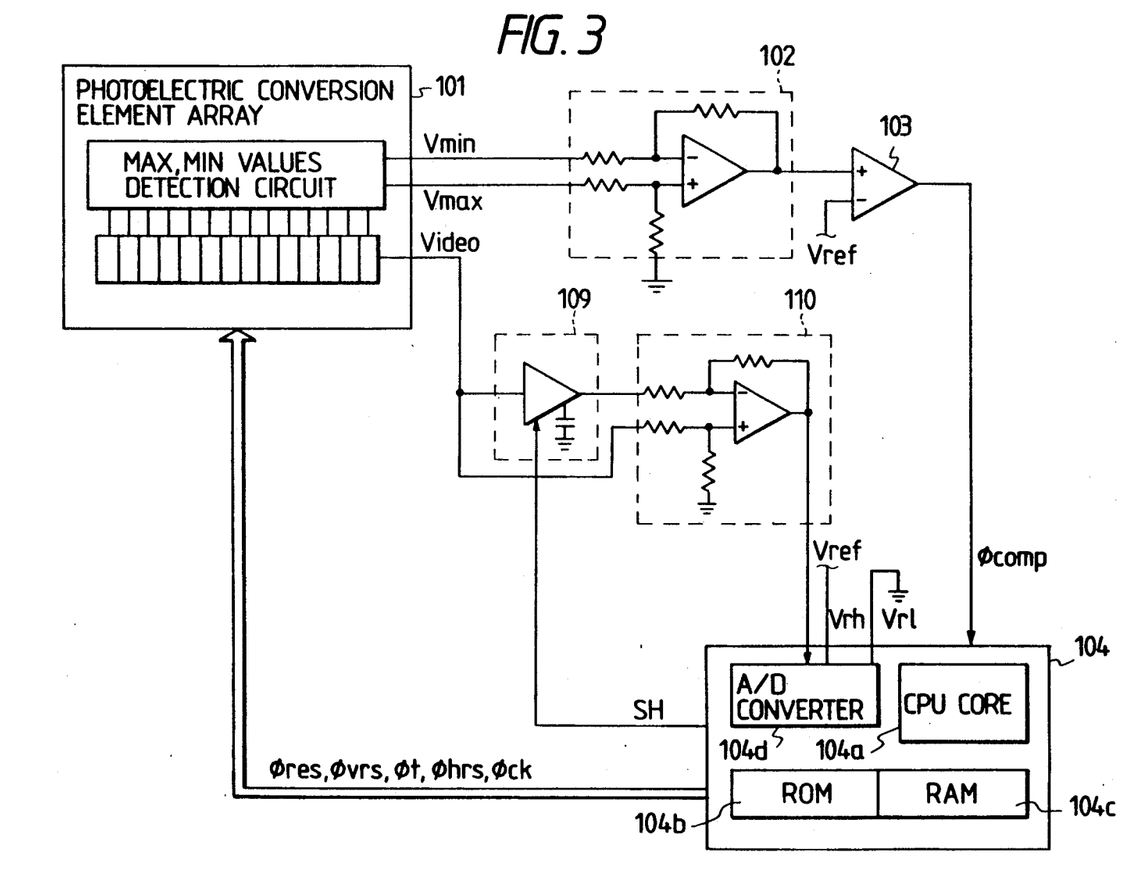
FIGS. 3 and 4 are block diagrams of practical photoelectric converting apparatuses using the photoelectric conversion element array of the first embodiment.
Figure 4:
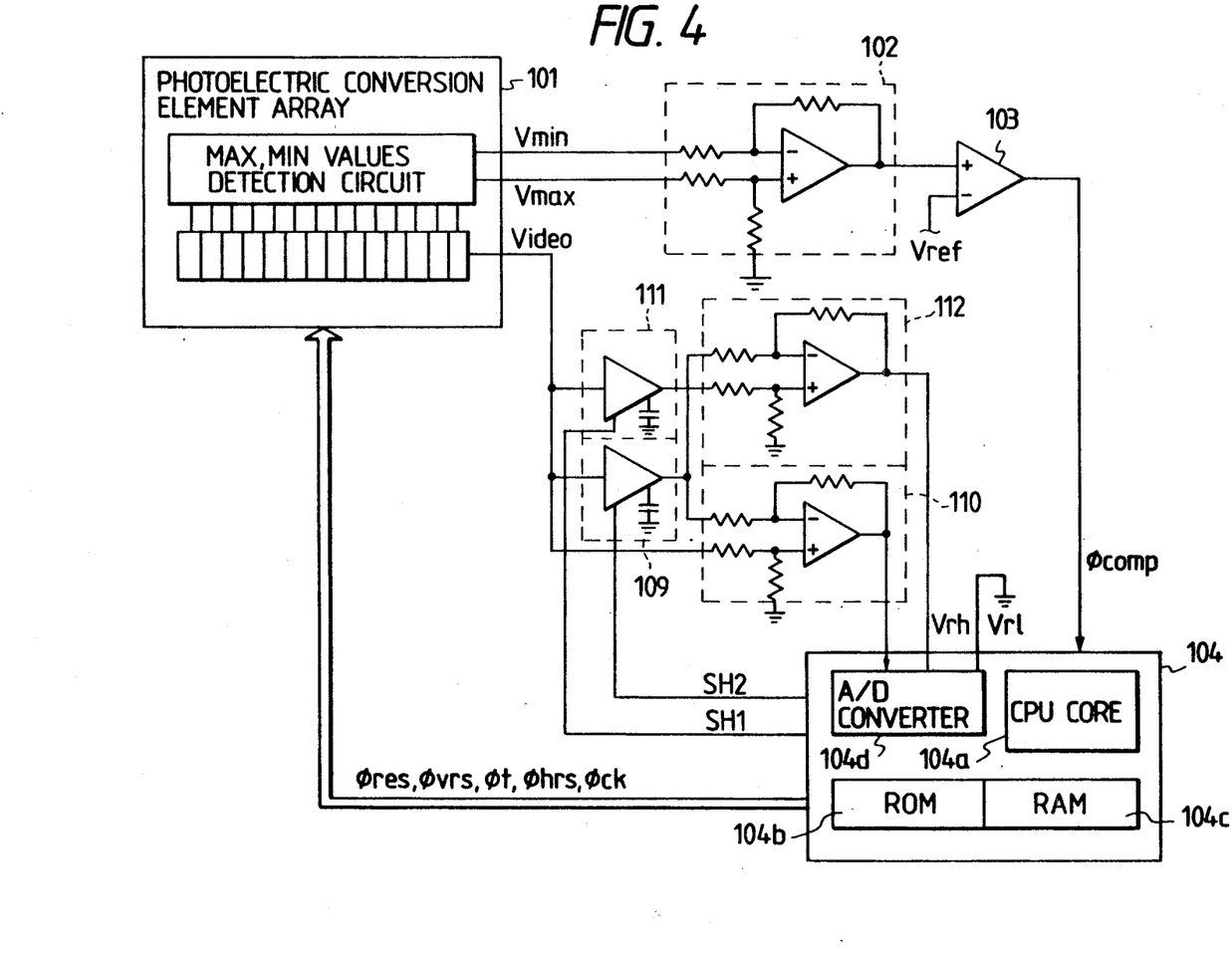

FIGS. 3 and 4 are block diagrams of practical photoelectric converting apparatuses using the photoelectric conversion element array of the embodiment.

In FIGS. 3 and 4, reference numeral 101 denotes the photoelectric conversion element array shown in FIG. 1; 102 indicates the differential amplifier for obtaining a difference between $V_{max}$ and $V_{min}$; and 103 the comparator for comparing the output of the differential amplifier 102 and the predetermined reference level $V_{ref}$ and discriminating whether the output level has reached a proper accumulation level or not. Reference numerals 109 and 111 denote memory circuits for respectively storing the signals of the maximum and minimum values which are output from a Video line; 110 a differential amplifier for obtaining a difference between an output of the memory circuit 109 and the output signal of the photoelectric conversion element array which is output from the Video line; 112 a differential amplifier for obtaining a difference between the outputs of the memory circuits 111 and 109; and 104 the microcomputer. The microcomputer 104 comprises: a CPU core 104a; an ROM 104b; an RAM 104c; and an A/D converter 104d.

In the photoelectric converting apparatus shown in FIG. 3, the microcomputer 104 first outputs the reset signals $\phi_{res}$ and $\phi_{vrs}$, thereby starting the accumulation. Then, the microcomputer receives the inverted signal $\phi_{comp}$ of the comparator 103 and outputs the transfer pulse $\phi_t$, thereby stopping the accumulation. Further, the pulse $\phi_{hrs}$ and the clock $\phi_{CK}$ are output to execute the reading operation. At this time, a sampling signal SH is sent from the microcomputer 104 to the memory circuit 109 at a timing of the output of the minimum value, so that the minimum value is stored into the memory circuit 109. A difference between the output of the photoelectric conversion element array which is subsequently output and the minimum value is obtained by the differential amplifier 110 and is A/D converted. At this time, since a reference potential $V_{rl}$ of the A/D conversion is set to the earth potential and $V_{rh}$ is set to $V_{ref}$, the A/D conversion is executed at a value between almost the maximum and minimum values of the output of the photoelectric conversion element array. However, at this time, the minimum value as a reference of the output of the photoelectric conversion element array is accurately read out as compared with that in the case of the conventional photoelectric converting apparatus shown in FIG. 11, so that the A/D conversion is accurately performed with respect to the contrast portion of an object.

In the photoelectric converting apparatus shown in FIG. 4, the microcomputer 104 outputs sampling signals $SH_1$ and $SH_2$ at timings when the maximum and minimum values are output from the line, thereby storing the maximum and minimum values of the photoelectric conversion element array into the memory circuits 111 and 109, respectively. A difference between the output of the photoelectric conversion element array which is subsequently output and the minimum value is obtained by the differential amplifier 110 and is input to the A/D converter. At this time, although the reference potential $V_{rl}$ of the A/D conversion is set to the earch potential, $V_{rh}$ is set to a potential which is equal to the difference between the maximum and minimum values which is obtained from the differential amplifier 112. The actual maximum and minimum values of the photoelectric conversion element array are not always accurately reflected to the values of $V_{min}$ and $V_{max}$ as mentioned above. Therefore, even if the accumulation is finished at a time point when $(V_{max}-V_{min})$ has reached the $V_{ref}$ level, a width of the actual signal is not always equal to $V_{ref}$. Therefore, by setting the actual signal width into the A/D conversion range as shown in the example of the photoelectric converting apparatus of FIG. 4, the A/D conversion can be effectively executed by using the A/D conversion range without exceeding the A/D conversion range.

Figure 5:
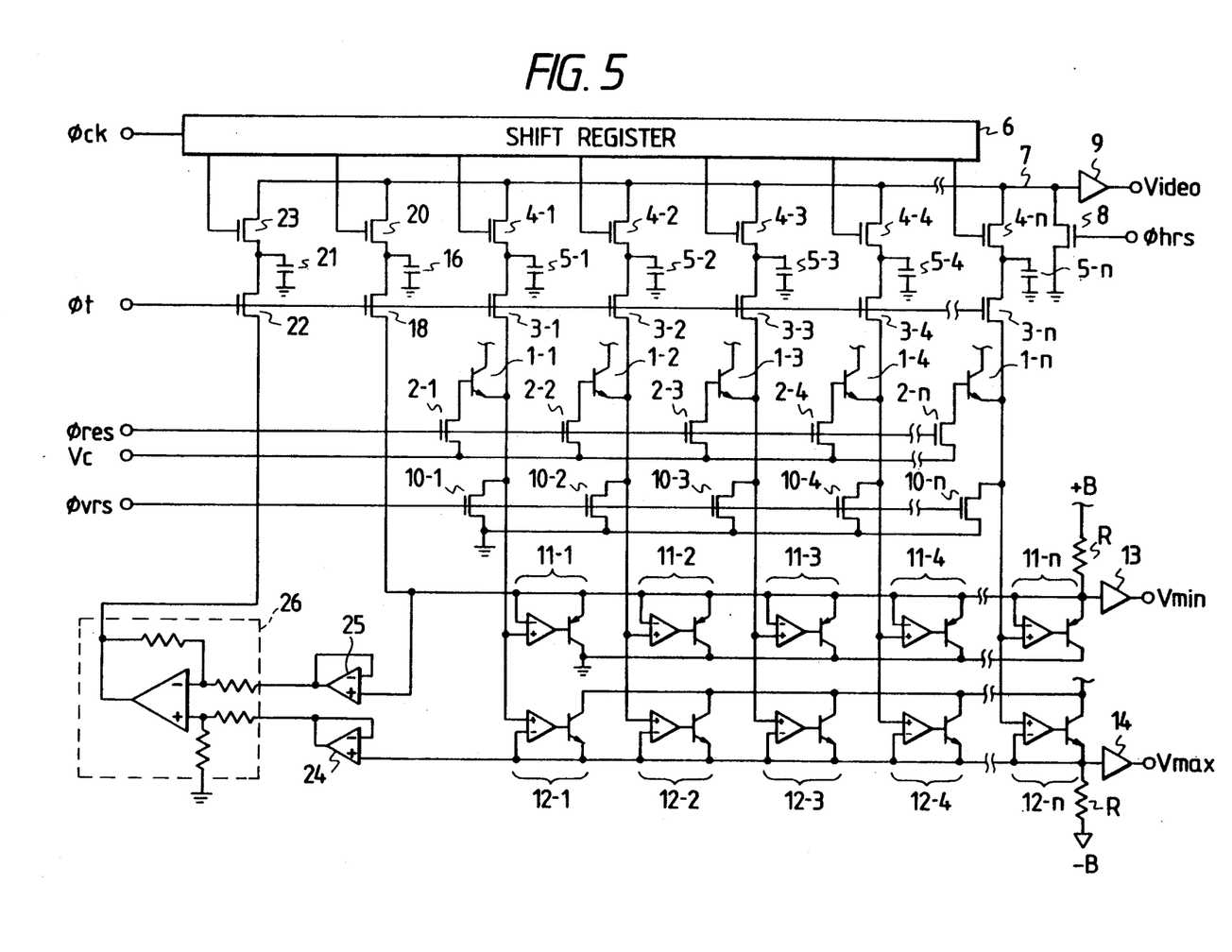
FIG. 5 is a circuit diagram showing a construction of the second embodiment of the photoelectric conversion element array as a characteristic portion of the photoelectric converting apparatus of the invention.

FIG. 5 is a circuit diagram showing a construction of the second embodiment of the photoelectric conversion element array as a characteristic portion of the photoelectric converting apparatus of the invention. The same parts and components as those shown in FIG. 1 are designated by the same reference numerals and their descriptions are omitted here.

It is a feature of the embodiment that not only the maximum and minimum values of the output of the photoelectric conversion element array are used but also a difference between the maximum and minimum values is obtained by using the differential amplifier 26 and is read out of the same read-out line as that of the photoelectric conversion element array. The operation of the second embodiment is almost the same as that of the first embodiment except that the difference between the maximum and minimum values of the output of the photoelectric conversion element array is accumulated into an accumulation capacitor 21 by the pulse $\phi_t$ in place of the maximum value of the output of the photoelectric conversion element array and is read out to the read-out line 7 by the shift register 6 through the NMOS switch 23.

Figure 6:
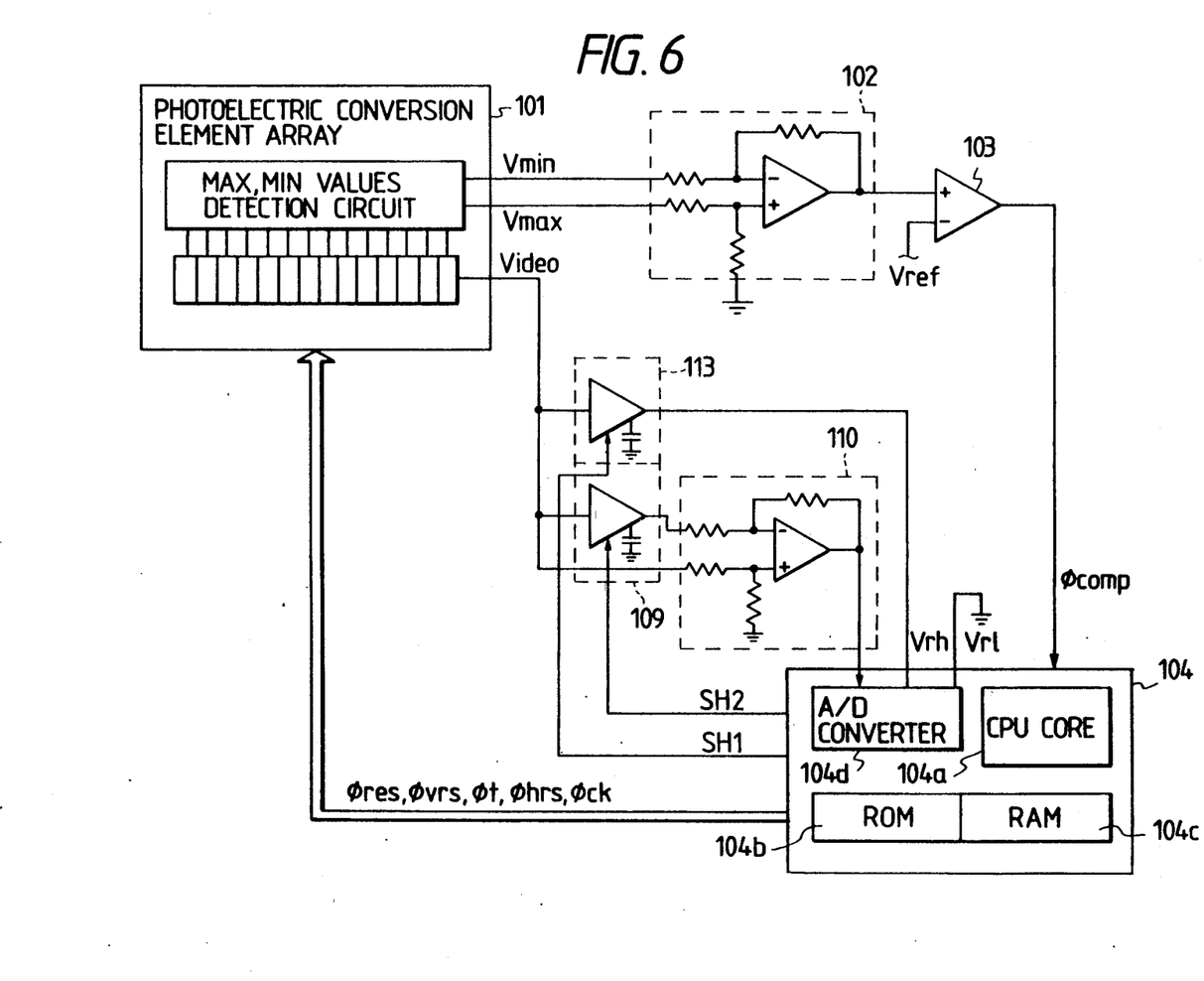
FIG. 6 is a block diagram of a practical photoelectric converting apparatus using the photoelectric conversion element array of the second embodiment.

In this case, by using a construction as shown in a photoelectric converting apparatus of FIG. 6, an effect similar to that in the example shown in the photoelectric converting apparatus of FIG. 4 is obtained. That is, the microcomputer outputs the sampling pulses $SH_1$ and $SH_2$ at timings when the difference between the maximum and minimum values which is read out from the video line and the minimum value are output, respectively, thereby storing the signals into memory circuits 113 and 109. An output of the memory circuit 113 is set to the reference potential on the high potential side upon A/D conversion. A difference between the output of the photoelectric conversion element array which is subsequently output and the output of the memory circuit 109 is obtained by the differential amplifier 110 and is A/D converted.

Although the example in which the difference between the maximum and minimum values of the accumulation signal of the photoelectric conversion element array is read out has been described above, it is also possible to construct in a manner such that a difference between the maximum of minimum value and a special bit (for instance, a light shielding bit) in the photoelectric conversion element array is obtained in accordance with the necessity of a process which will be executed at the post stage and is read out by using the same reading system. On the other hand, the invention is not limited to the difference between the maximum and minimum values but the result which is obtained by executing an addition or a multiplication to multiply with a constant or the like in accordance with the necessity of the process at the post stage can be also read out by using the same reading system.

As described above, according to the photoelectric converting apparatus of the invention, a deviation(s) between the signal(s) which is/are obtained from the maximum value detecting means or/and the minimum value detecting means and the accumulation signal of the photoelectric conversion element is/are eliminated and a signal to which the charges accumulated in a plurality of photoelectric conversion elements were accurately reflected can be obtained.

On the other hand, according to the photoelectric converting apparatus of the invention, a deviation between the signal obtained by calculating on the basis of the signal(s) which is/are obtained from the maximum value detecting means or/and the minimum value detecting means and the accumulation signal of the photoelectric conversion elements is eliminated, and the signal to which the charges accumulated in a plurality of photoelectric conversion elements were accurately reflected can be obtained.

I claim:

1. A photoelectric converting apparatus comprising:
a plurality of photoelectric conversion elements for accumulating charges which were photoelectrically converted within a predetermined time;
a common output amplifier;
at least one of maximum value detecting means for detecting a maximum accumulation signal of one of said photoelectric conversion elements into which a strongest light impinges and minimum value detecting means for detecting a minimum accumulation signal of one of said photoelectric conversion elements into which a weakest light impinges; and
reading means for reading out the maximum accumulation signal obtained from said maximum value detecting means or/and the minimum accumulation signal obtained from said minimum detecting means through said common output amplifier.

2. A photoelectric converting apparatus comprising:
a plurality of photoelectric conversion elements for accumulating charges which were photoelectrically converted within a predetermined time;
a common output amplifier;
at least one of maximum value detecting means for detecting a maximum accumulation signal of one of said photoelectric conversion elements into which a strongest light impinges and minimum value detecting means for detecting a minimum accumulation signal of one of said photoelectric conversion elements into which a weakest light impinges;
operation means for executing an operation on the basis of the maximum accumulation signal obtained from said maximum value detecting means or/and the minimum accumulation signal obtained from said minimum value detecting means; and
reading means for reading out a signal obtained by the operation means through said common output amplifier.

3. An apparatus according to claim 1, further comprising amplifying means; and
second reading means for reading out the maximum accumulation signal from said maximum value detecting means and/or the minimum accumulation signal from said minimum value detecting means through said amplifying means.

4. An apparatus according to claim 3, further comprising control means for controlling the predetermined time of accumulation by said photoelectric conversion elements in response to said second reading means.

5. An apparatus according to claim 1, further comprising analog-to-digital converting means for analog-to-digitally converting the outputs of the plurality of photoelectric conversion elements for detection by at least one of said maximum and minimum value detecting means.

6. An apparatus according to claim 5, further comprising control means for controlling minimum and maximum values of said analog-to-digital converting means on the basis of the maximum accumulation signal and/or the minimum accumulation signal read out by said reading means through said common output amplifier.

7. An apparatus according to claim 2, further comprising amplifying means; and
second reading means for reading out the maximum accumulation signal from said maximum value detecting means and/or the minimum accumulation signal from said minimum value detecting means through said amplifying means.

8. An apparatus according to claim 7, further comprising control means for controlling the predetermined time of accumulation by said photoelectric conversion elements in response to said second reading means.

9. An apparatus according to claim 2, further comprising analog-to-digital converting means for analog-to-digitally converting the outputs of the plurality of photoelectric conversion elements for detection by at least one of said maximum and minimum value detecting means.

10. An apparatus according to claim 9, further comprising control means for controlling minimum and maximum values of the converting means on the basis of the maximum accumulation signal and/or the minimum accumulation signal read out by said reading means through said common output amplifier.

11. An apparatus according to claim 2, wherein the operation means includes subtracting means for subtracting outputs of said maximum the value detecting means and said minimum value detecting means.

12. An apparatus according to claim 11, wherein said operation means provides a difference between the output of said maximum value detecting means and the output of said minimum value detecting means.

* * * * *

UNITED STATES PATENT AND TRADEMARK OFFICE
CERTIFICATE OF CORRECTION

PATENT NO.  : 5,182,447
DATED       : January 26, 1993
INVENTOR(S) : TOSHIKI NAKAYAMA It is certified that error appears in the above-identified patent and that said Letters Patent is hereby corrected as shown below:

COLUMN 2

Line 52, "grounded," should read --ground,--.

COLUMN 7

Line 55, "earch" should read --earth--.

COLUMN 10

Line 46, "the" should be deleted.

Signed and Sealed this

Eleventh Day of January, 1994

Attest:

BRUCE LEHMAN

Attesting Officer       Commissioner of Patents and Trademarks